United States Patent Office 2,844,583
Patented July 22, 1958

2,844,583
PRODUCTION OF 2-METHYL-5-ETHYLPYRIDINE

Arthur W. Schnizer and Adin L. Stautzenberger, Corpus Christi, Tex., assignors to Celanese Corporation of America, New York, N. Y., a corporation of Delaware No Drawing. Application October 20, 1952
Serial No. 315,813

5 Claims. (Cl. 260—290)

Paraldehyde has been reacted with ammonia to produce 2-methyl-5-ethylpyridine according to the reaction:

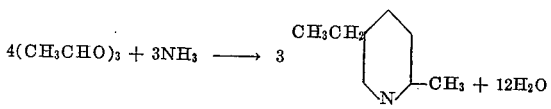

$4(CH_3CHO)_3 + 3NH_3 \longrightarrow 3 \; [pyridine\; with\; CH_3CH_2\; and\; CH_3\; substituents] + 12H_2O$ However, this reaction has not proved to be as efficient and economical as desired.

It is therefore an object of this invention to increase the efficiency and economy of the production of 2-methyl-5-ethylpyridine by the reaction of paraldehyde and ammonia.

A further object of this invention is the provision of a new and improved process by which 2-methyl-5-ethylpyridine may be obtained in high yields.

Other objects of this invention will be apparent from the following detailed description and claims.

According to one aspect of this invention, we have found that the yield of 2-methyl-5-ethylpyridine in the reaction of paraldehyde and ammonia may be considerably increased by the addition, to the reaction mixture, of the less volatile compounds produced by the reaction.

According to another aspect of our invention, we have discovered that an improved yield of 2-methyl-5-ethylpyridine results when the reaction of the paraldehyde and ammonia is carried out in a stainless steel reaction vessel.

We have also discovered that the yield of 2-methyl-5-ethylpyridine may be increased appreciably by the presence of certain large proportions of ammonium salts in the reaction mixture.

In carrying out the reaction with ammonia the paraldehyde may be added to the ammonia in the purified form, or, more cheaply, in the form of an equilibrium mixture of an acid, such as sulfuric acid, with paraldehyde and acetaldehyde, produced by adding the acid to the acetaldehyde.

The ammonia is preferably employed in the form of an aqueous solution e. g. concentrated ammonium hydroxide. An excess of the amount of ammonia over that theoretically necessary for the reaction, i. e. 0.75 mol of ammonia per mole of paraldehyde, should be present. For optimum results we use about 3.75 to 6.00 moles of ammonia per mole of paraldehyde.

In our preferred procedure, the reaction is carried out in the presence of an ammonium salt, which is generally present in the form of a solution thereof in the aqueous reaction medium. While we may use any of the water-soluble salts of ammonia, such as the acetate, chloride, carbonate or sulfate, best results are obtained with ammonium acetate. A convenient method for incorporating the catalyst involves the addition of an acid, such as acetic, directly to the aqueous ammonia reactant, so that the ammonium salt is formed in situ. We have found that greatly improved yields are obtained when the concentration of ammonium salt catalyst is at least 0.15 mole per mole of paraldehyde, while concentrations above about 3/8 mole per mole of paraldehyde give optimum yields. Concentrations as high as 3 moles of ammonium acetate per mole of paraldehyde have been employed but such large amounts do not produce much better yields than those obtained with 3/4 mole of ammonium salt per mol of paraldehyde, which is a practical upper limit.

When the paraldehyde is used in the form of an equilibrium mixture obtained from acetaldehyde, the proportions are calculated on the basis of an assumed complete conversion of acetaldehyde to paraldehyde.

The reaction between the ammonia and paraldehyde proceeds smoothly at elevated temperatures, preferably in the range of about 200° to 250° C. Within this range we have found that variations of temperature have no significant effect on yields when the concentrations of the ammonium salt are low. However, with our preferred high concentrations of at least 0.15 mole of ammonium salt per mole of paraldehyde the highest yields are obtained with the lower temperatures. A range of 200–220° C. is therefore preferred.

To maintain the reactants in the liquid phase the reaction is carried out under pressure, preferably in an autoclave where the pressures range from about 500 to 1000 pounds per square inch gauge. The autoclave or other reaction vessel is desirably made of stainless steel, preferably chromium-nickel stainless steel, such as type 316 or type 347 stainless steel. By the use of stainless steel in place of carbon steel we have been able to raise the yield considerably, for example from a yield of 65% to a yield of more than 71%.

The mixture resulting from the reaction consists of an aqueous phase and non-aqueous phase, with most of the 2-methyl-5-ethylpyridine being in the non-aqueous phase. However, an appreciable amount of the 2-methyl-5-ethylpyridine may be recovered from the aqueous phase by extraction, which may be carried out with a water-immiscible organic solvent, such as chloroform, benzene, or ether. The reaction products, which may constitute the non-aqueous phase alone or combined with the extract from the aqueous phase, may be separated by distillation into four portions: a small fraction containing paraldehyde and 2-methylpyridine; a major portion of 2-methyl-5-ethylpyridine; a minor amount of higher boiling material, boiling at 50–180° C. at a pressure of 2 mm. of mercury absolute, hereafter designated as "high boilers"; and a small amount of non-distillable residue. We have discovered that by adding "high boilers" to the reaction mixture, before or during the reaction, we may obtain an appreciable improvement in the yield of 2-methyl-5-ethylpyridine. If desired, the high boilers may be added to the reaction mixture together with the non-distillable residue, in which case it is not necessary to separate the high boilers from the residue by distillation. The proportion of high boilers so added may be varied widely; for example, from 5% to 25% based on weight of paraldehyde.

The aqueous phase remaining after the extraction with organic solvent may be used again by saturating it with ammonia and mixing it with paraldehyde for further reaction, thus saving its high content of ammonium salt. This aqueous phase has been diluted by water produced in the reaction. Accordingly, to maintain constant reaction volume only part, e. g. 81%, is recycled and it is necessary to add a further small amount of ammonium salt or acid to maintain the concentration of ammonium salt. If it is desired to avoid any further addition of ammonium salt, the water of reaction may be removed, as by distillation, before the step of saturating with ammonia.

The process of this invention may be carried out batchwise or continuously. In the continuous process it is desirable to add an emulsifying agent to the reaction mixture and to employ a reactor which has suitable baffles or which is of such dimensions that turbulent flow occurs through it to insure thorough mixing of the aqueous and non-aqueous phases. Examples of suitable emulsifying agents are sorbitan monolaurate and the polyoxyalkylene ethers of sorbitan monolaurate. If the mixing is sufficiently turbulent no emulsifying agent is necessary.

In order further to illustrate our invention but without being limited thereto the following examples are given:

Example I

An autoclave made of type 316 stainless steel is charged with 176 parts by weight of paraldehyde (1.33 moles); 45 parts by weight of "high boilers" having a boiling point of 50–180° C. at a pressure of 2 mm. of mercury, obtained by distillation of the products of a previous reaction of paralydehyde and ammonia; 420 parts by weight of concentrated ammonium hydroxide (7 moles); and 60 parts by weight of acetic acid (1 mole) and heated gradually until the temperature reaches 220° C. Agitation of the autoclave is unnecessary. After 2 hours and 40 minutes at 220 C. the autoclave is cooled, the contents are removed and the organic layer is taken up in 148 parts by weight of chloroform, while the aqueous layer is extracted with four portions of chloroform, each portion being 37 parts by weight. The chloroform extracts are combined and dried by distilling off first the water-chloroform azeotrope and then the remaining chloroform. On distillation of the residue at a pressure of 22 mm. of mercury there are obtained three fractions and a non-distillable residue. The first small fraction distills at temperatures below 72° C., and is probably mainly 2-methylpyridine. The second fraction, distilling at 72–80° C., is substantially pure 2-methyl-5-ethylpyridine, and is obtained in the amount of 98.4 parts by weight, which is 81.3% of the theoretical yield, based upon the amount of paralyehyde present in the reaction. The third fraction, distilling above 50° C. up to about 180° C. at 2 mm. Hg is designated as "high boilers."

Similar batch experiments conducted under substantially the same conditions but without the addition of high boilers to the reactants result in yields of about 73–75%.

The process of this example may be carried on continuously, with substantially the same results, by continuously passing the reactants containing 0.8%, based on the weight of the reaction mixture, of a mixture of equal amounts of "Span 20" (sorbitan monolaurate) and "Tween 20" (a sorbitan monolaurate polyoxyalkylene ether), under pressure through a heated stainless steel reactor equipped with baffles, and continuously withdrawing the reaction mixture from the reactor, the feed rates and withdrawal rates being constant and adjusted so as to produce a residence time of 80 minutes in the reactor.

Example II

The reaction time may be reduced from 2 hours and 40 minutes to one hour without any substantial change in yield. Two experiments, substantially identical except for the time of reaction, are carried out in which the procedure of the batch process of Example I is followed, except that "high boilers' are not added to the reactants and there are employed 1 mole of paraldehyde, 6.19 moles of ammonia and 0.188 moles of acetic acid, at a reaction temperature of about 230° C. Where the reaction time is one hour, the yield of 2-methyl-5-ethylpyridine is 70.4% of the theoretical yield based on the amount of paraldehyde, as compared with a yield of 70.7% where the reaction time is 2 hours and 40 minutes.

Example III

The procedure of Example I is followed, with the following exceptions: No high boilers are added. In place of the 1.33 moles of paraldehyde there is employed a mixture of 4 moles of acetaldehyde and 0.1% of concentrated sulfuric acid, based on the weight of the acetaldehyde, which has been allowed to react for 1 hour at 20 C. 8.3 moles of ammonia and 0.25 mole of acetic acid are used. After a reaction time of 1 hour 6 minutes at 228° C. there is obtained 2-methyl-5-ethylpyridine in a yield of 68.6% of the theoretical yield, based on the amount of acetaldehyde.

It is to be understood that the foregoing detailed description is given merely by way of illustration and that many variations may be made therein without departing from the spirit of our invention.

Having described our invention, what we desire to secure by Letters Patent is:

1. In the process for the production of 2-methyl-5-ethylpyridine by the reaction of paraldehyde with ammonia, the improvement which comprises increasing the yield of 2-methyl-5-ethylpyridine by adding to the reaction mixture the less volatile products of the reaction of paraldehyde with ammonia to produce 2-methyl-5-ethylpyridine, said less volatile products comprising those which distill, under reduced pressure, at a temperature above the distillation range of 2-methyl-5-ethylpyridine.

2. In the process for the production of 2-methyl-5-ethylpyridine by the reaction of paraldehyde with excess aqueous ammonia in the presence of a water-soluble ammonium salt, the improvement which comprises increasing the yield at 2-methyl-5-ethylpyridine by adding to the reaction mixture the less volatile products of the reaction of paraldehyde with ammonia to produce 2-methyl-5-ethylpyridine, said less volatile products comprising those which distill, under reduced pressure, at a temperature above the distillation range of 2-methyl-5-ethylpyridine.

3. Process for the production of 2-methyl-5-ethylpyridine which comprises reacting paraldehyde with excess aqueous ammonia at a temperature of about 200–250° C. in the presence of at least 0.15 mole of a water-soluble ammonium salt per mole of paraldehyde and of added less volatile products of the reaction of paraldehyde with ammonia to produce 2-methyl-5-ethylpyridine, said less volatile products comprising those which distill, under reduced pressure, at a temperature above the distillation range of 2-methyl-5-ethylpyridine.

4. Process for the production of 2-methyl-5-ethylpyridine which comprises reacting acetaldehyde with an acid to produce paraldehyde, then reacting the resulting reaction mixture in a stainless steel vessel with excess aqueous ammonia in the presence of at least 0.15 mole of a water-soluble ammonium salt per mole of paraldehyde and of added less volatile products of the reaction of paraldehyde with ammonia to produce 2-methyl-5-ethylpyridine, said less volatile products comprising those which distill, under reduced pressure, at a temperature above the distillation range of 2-methyl-5-ethylpyridine, separating the aqueous phase of the resulting mixture, saturating said aqueous phase with ammonia and reacting said saturated aqueous phase with more of the acetaldehyde-acid reaction mixture under the same conditions as stated above.

5. Process for the production of 2-methyl-5-ethyl-pyridine which comprises reacting paraldehyde with excess aqueous ammonia at a temperature of 200–220° C. in the presence of at least 0.15 mole of a water-soluble ammonium salt per mole of paraldehyde and of added less volatile products of the reaction of paraldehyde with ammonia to produce ,2-methyl-5-ethylpyridine, said less volatile products comprising those which distill, under reduced pressure, at a temperature above the distillation range of 2-methyl-5-ethylpyridine.

(References on following page)

References Cited in the file of this patent

UNITED STATES PATENTS

| | | |
|---|---|---|
| 2,615,022 | Mahan | Oct. 21, 1952 |

FOREIGN PATENTS

| | | |
|---|---|---|
| 147,000 | Great Britain | Mar. 17, 1921 |
| 521,891 | France | Mar. 16, 1921 |
| 349,184 | Germany | Feb. 24, 1922 |
| 534,494 | Great Britain | Mar. 7, 1941 |

OTHER REFERENCES

Whitemore: "Organic Chemistry," 1951, 2nd. ed., pp. 194–196.

Frank et al.: Journal of the American Chemical Society, vol. 68, page 1368, July 1946.